Aug. 6, 1935.  J. HEATH  2,010,633
ADJUSTABLE SLIDING SEAT
Filed Aug. 28, 1934
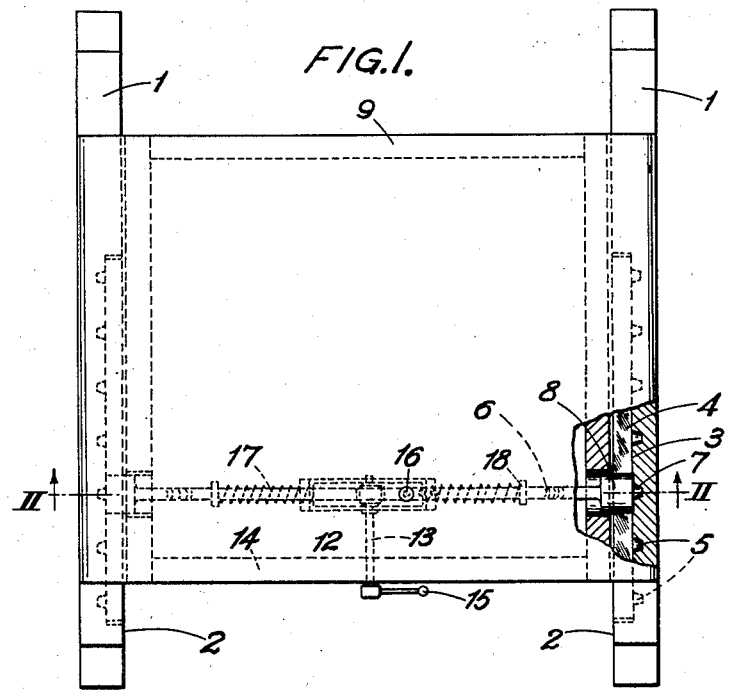
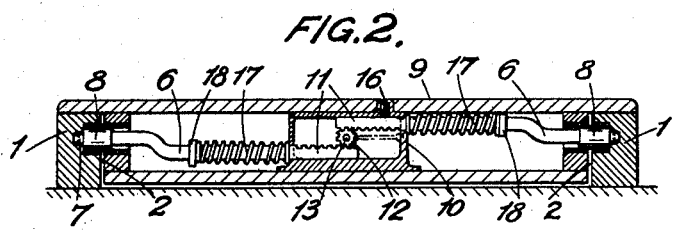
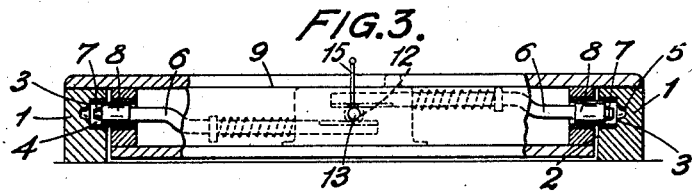
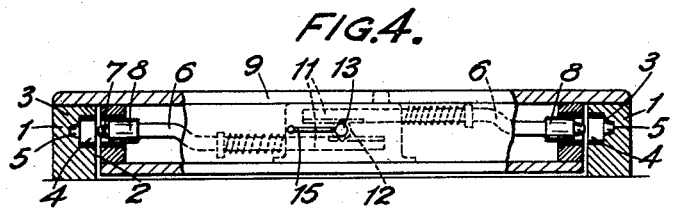
INVENTOR
JOHN HEATH,
BY Carroll Bailey
ATTORNEY Patented Aug. 6, 1935

2,010,633

UNITED STATES PATENT OFFICE 2,010,633

ADJUSTABLE SLIDING SEAT

John Heath, Forest Gate, London, England

Application August 28, 1934, Serial No. 741,857
In Great Britain September 8, 1933

2 Claims. (Cl. 155—14)

This invention relates to improvements in slidable mountings for seats (such as automobile seats), wagon bodies, merchandise containers, and other articles and structures which are required to be slidably adjusted in one of a number of different positions on a relatively fixed base, and which also, on occasion, are lifted vertically away from the base at the particular position occupied by the parts at that moment. For convenience the following description will be confined to vehicle seats wherein the relatively fixed base is the floor of the body or a suitable framework thereon, but it is to be understood that the description is applicable in the wider sense indicated above where the context admits.

The invention relates to that type of slidable mounting wherein the seat slides between a pair of longitudinal guides or runways, and can be locked in various longitudinal positions by means of a pair of transverse oppositely sliding bolts on the seat engaging the guides. The primary objects of the invention are to ensure rigidity and prevent rocking of the seat, to permit instantaneous detachment, and to provide a smoothly working and sturdy operating mechanism.

According to the invention the free ends of the bolts are tongued, flattened or otherwise formed with upper and lower parallel faces to engage snugly and slidably with the upper and lower contacting faces respectively of the guide, which may be grooved or channel section metal, or constructed in wood. This construction prevents the seat fulcrumming on the bolts which is otherwise likely to occur however accurately the seat frame may be shouldered and fitted between the guides. The inner ends respectively of the bolts are toothed in rack fashion and lie one on each side of a pinion rotatable on the seat under the action of an operating spindle disposed between and parallel with the guides.

In order that the said invention may be clearly understood an embodiment will be described by way of example, with reference to the accompanying drawing, wherein:—

Figure 1 is a plan view of the embodiment showing the slidable seat partly broken away to expose the end of a bolt in its guide;

Figure 2 is a transverse section on the line II—II of Figure 1;

Figures 3 and 4 are views similar to Figure 2 but with the mechanism in different positions.

Referring to the drawing, there is a pair of parallel guides 1 spaced apart and having their opposed faces 2 slotted lengthwise. The inner or vertical face 3 of each slot 4 is provided with a series of circular section holes 5 which are preferably tapered. The oppositely slidable bolts mounted on the seat 9 are designated 6 and their guide-engaging ends are formed at their extremities with circular section noses 7 advantageously of frusto-conical shape to fit the aforesaid series of holes 5, and slightly inward of these extremities are the flattened members hereinbefore referred to. These are in the form of substantially rectangular tongues 8 which fit their respective slots 4 in the guides 1.

The bolts 6 have three postions, viz:—(A) full home with the conical noses 7 engaged in their respective holes 5 in the guides 1 and the tongues 8 in the slots 4 (as in Figures 1 and 2), (B) partly withdrawn with the conical noses 7 out of the holes 5 and the tongues 8 fully or partly out of the slots 4 (as in Figure 3), and (C) fully withdrawn with the tongues and conical noses quite clear of the guides 1 (see Figure 4). In these three positions, in order, the seat is either locked in one requisite position, or free to slide in the guides, or finally free to be lifted vertically from between the guides.

Underneath the seat 9 a small housing 10 is fitted into which the inner rack ends 11 of the bolts 6 extend, and said housing contains the hereinbefore mentioned pinion 12 with which the racks 11 engage. The pinion is fixed to an operating spindle 13 projecting forwardly of the seat and journalled on or through a transverse frame 14 of the seat, which is shouldered to fit easily between the guides 1 and to run on top thereof. The tops of the guides 1, the tongues 8, or other appropriate parts may be furnished with ball bearings, rollers or other anti-friction devices.

The rotation of the pinion spindle 13 by means of an exterior handle, lever or the knob 15, brings about the three positions mentioned herein, and the gearing is preferably such that movement of the pinion through 180° is the limit from position (A) to position (C). A spring catch, resiliently mounted ball, stud, detent, or other means may be employed to locate and retain the mechanism definitely in the adjusted position of the bolts. In the drawing a spring-pressed ball 16 is let into the seat and engages three depressions on top of one of the racks 11. This locating means could be associated with either or both of the racks or pinion, or with the spindle and its handle or otherwise as found convenient, the ball 16 or equivalent being on one part, and the depressions on an adjacent relatively movable element.

The bolts are adapted to be withdrawn against spring action, for which purpose compression springs 17 may encircle each bolt 6 and press against the rack and pinion housing 10 at one end, and against a collar 18 on the bolt at the other.

It is to be understood that the pair of oppositely working bolts may be duplicated or multiplied, and adapted to be operated in unison.

I claim:—

1. An adjustable seat structure comprising a pair of spaced apart substantially horizontally disposed parallel seat supporting members each having a longitudinally extending channel opening through its inner face, each member also having a series of recesses spaced apart longitudinally of the member and opening into the related channel through the outer wall thereof, a seat, a pair of bolts carried by and extending transversely of said seat and having head formations disposed in the channels of said supporting members, respectively, said head formations substantially corresponding in thickness to the height of the channels so that the seat is held against vertical movements relative to said supporting members and is supported thereon through the instrumentality of said bolts and the head formations thereof, projections on said bolt heads to enter selected recesses thereby to hold the seat against movement longitudinally relative to the supporting members, and means for projecting and retracting said bolts, the projections being of lesser length than the width of said channels so that by partially retracting the bolts said projections may be withdrawn from the recesses while the bolt heads remain in said channels thereby to support the seat for sliding adjustment.

2. An adjustable seat structure as set forth in claim 1 in which the recesses and the projections are outwardly tapered.

JOHN HEATH.